(12) United States Patent
Cleary

(10) Patent No.: US 10,203,227 B2
(45) Date of Patent: Feb. 12, 2019

(54) MARKER FOR APPLICATION TO SURFACES AT HIGH AND SUSTAINED OPERATING TEMPERATURES

(71) Applicant: Smartwater Limited, London (GB)

(72) Inventor: Michael Cleary, London (GB)

(73) Assignee: Smartwater Limited, London (GB)

( * ) Notice: Subject to any disclaimer, the term of this patent is extended or adjusted under 35 U.S.C. 154(b) by 1321 days.

(21) Appl. No.: 13/630,838

(22) Filed: Sep. 28, 2012

(65) Prior Publication Data

US 2014/0092233 A1 Apr. 3, 2014

(51) Int. Cl.
*G01D 7/00* (2006.01)
*C09D 1/02* (2006.01)

(52) U.S. Cl.
CPC ............... *G01D 7/00* (2013.01); *C09D 1/02* (2013.01); *Y10T 156/10* (2015.01)

(58) Field of Classification Search
CPC ............ G01D 7/00; C09D 1/02; Y10T 156/10
See application file for complete search history.

(56) References Cited

U.S. PATENT DOCUMENTS

| 4,169,735 A | * | 10/1979 | Boberski | ................... | C09D 1/02 106/287.1 |
| 2008/0087189 A1 | * | 4/2008 | Lin | ..................... | B41M 3/144 106/31.9 |

FOREIGN PATENT DOCUMENTS

| EP | 0295834 A1 | * | 12/1988 | ............. | C04B 28/26 |
| EP | 1447394 | * | 8/2004 | | |
| GB | 1393246 A | | 5/1975 | | |
| GB | 2245583 A | | 1/1992 | | |
| GB | 2369078 A | | 5/2002 | | |
| GB | 2410208 A | | 7/2005 | | |
| GB | 2413675 B | | 4/2007 | | |
| GB | 2489483 A | | 10/2012 | | |
| WO | 9307233 A1 | | 4/1993 | | |
| WO | 2007041579 A2 | | 4/2007 | | |

OTHER PUBLICATIONS

CJS Event Solutions: Printed Apr. 23, 2013, "SmartWater Metal Theft Briefing." Jun. 13, 2012 http://www.cjsevents.co.uk/13/53/smartwater-metal-theft-briefing.

* cited by examiner

*Primary Examiner* — Samuel P Siefke
(74) *Attorney, Agent, or Firm* — Forrest Firm

(57) ABSTRACT

There is provided a marker system for applying to surfaces operating at high temperatures, the marker system comprising a marker and a temperature resilient medium capable of securing the marker system onto a high temperature surface; wherein the medium contains an inorganic matrix to secure the marker to a surface; wherein the marker comprises a fingerprint to render the marker unique; and wherein the marker system further comprises indicator material to indicate the presence of the marker. Further provided is a composition comprising the marker system. Further provided are engines, exhaust systems and/or catalytic converters or other surfaces operating at high temperatures comprising a surface impregnated with the marker system.

17 Claims, 1 Drawing Sheet

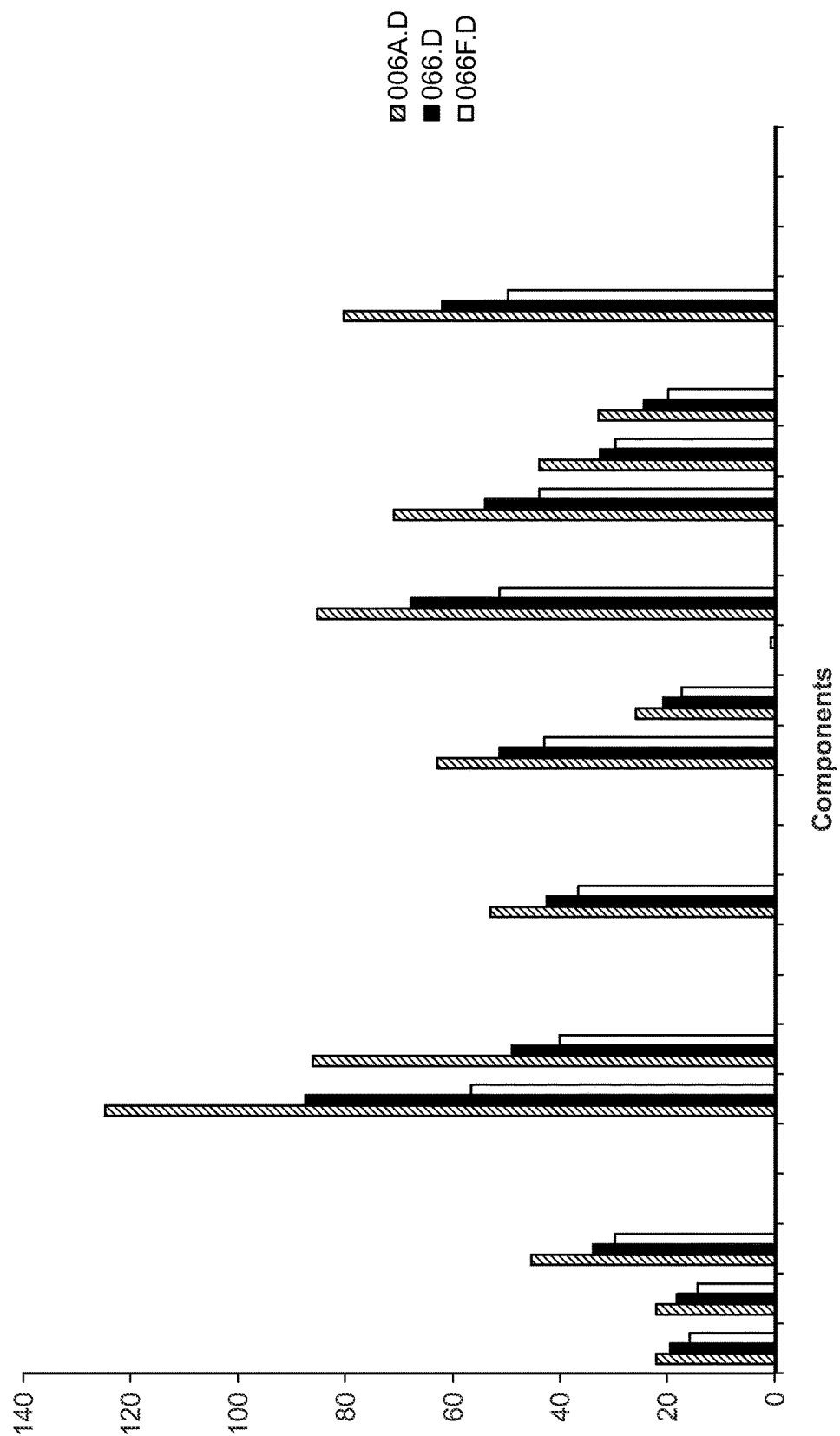

MARKER FOR APPLICATION TO SURFACES AT HIGH AND SUSTAINED OPERATING TEMPERATURES

FIELD OF THE INVENTION

The present invention relates to an improved marker system providing unique identification for use in the security and tracing of items and particularly engines, engine parts, exhaust systems and/or catalytic converters.

BACKGROUND TO THE INVENTION

Generally, non-ferrous metals are expensive materials and their price is steadily increasing. As a result theft of such metal items is on the incline. Accordingly, the theft of such metal items is particularly costly for the party suffering the loss, not only due to the high value of the materials involved but the ensuing loss due to disruption of business and infrastructure can be orders of magnitude higher.

Some metals are used in the construction of items which have high operating temperatures such as engines, engine parts, exhaust systems and catalytic converters. These systems can contain a mixture of ferrous and non-ferrous metals as well as rare earths such as rhodium, iridium, palladium and platinum. The high price of metals generally and the rare earths in particular has resulted in theft of items in which they are used. It appears that anything containing metal is considered valuable enough to warrant the attention of thieves.

There is therefore a need to prevent or at least reduce the level of such theft. A way of doing this is to provide a mark on the material which establishes proof of ownership. In this way theft can be established and charges brought against those in possession of items which could positively be identified as stolen.

In recent years, the use of marker systems has been particularly useful in preventing crime and for tracking and identifying the authenticity of items. Such marker systems, as have been developed by the applicant for many years, have found particular application in the fields of security and crime prevention/deterrence, for example as described in WO 93/07233, GB 2369078, GB 2410208 and GB 2413675, amongst others. Analysis of the surface onto which the marker system is placed or deployed can provide a reliable method of tracing or authenticating items, articles, goods, vehicles or persons.

Analysis of the surface onto which the marker system is placed or deployed can provide a reliable method of tracing or authenticating items, articles, goods or vehicles.

However when the items concerned operate at high temperatures for extended periods of time then extra care has to be taken in the development of the marker to ensure that the fingerprint it contains is stable under these operating conditions, thereby allowing the rightful owner to be identified and charges of theft made against those in possession of the item in question.

This is particularly the case when the marker system is used for tracking and/or identifying engines, engine parts, exhaust systems and/or catalytic converters. These items not only require that the marker can withstand high temperatures, but they require the marker to be able to cope with large temperature differentials; i.e. cold to hot in a matter of minutes when for example the vehicle is turned on and the reverse when the engine is turned off. Further, as these items generally contain toxic byproducts as well as flammable and corrosive substances, the marker system must be able to withstand exposure to these elements.

Therefore, there is a need for a marker system capable of withstanding high temperatures for extended periods of time so that marker and consequently the goods remain identifiable.

In a first aspect of the invention, there is provided a covert marker system for applying to surfaces that operate at high temperature. Suitable surfaces include surfaces such as engines, engine parts, exhaust systems and/or catalytic converters; however, any surface which is capable of receiving a marker and which operates at high operating temperatures is applicable in this context, said marker system comprising a marker and a temperature resilient medium capable of securing the marker system onto a surface with a high operating temperature; wherein the medium contains an soluble inorganic matrix to secure the marker to a surface, wherein the marker comprises a fingerprint to render the marker unique, and wherein the marker system further comprises indicator material to indicate the presence of the marker. The medium may be applied as an aqueous solution and may be left to air dry or may be heated to dry quickly. The silicate can be chosen so that it forms a cohesive layer which at this point forms a stable surface coating on the substrate upon drying at room temperature. As the temperature of the substrate increases the silicate then cross links to form a glass like structure which is capable of withstanding the high temperatures involved.

The present invention provides a marker system that is stable to high temperatures for extended periods of time. Preferably, the marker system comprises:
  a matrix to hold the marker in place on the marked substrate;
  a fingerprint rendering each marker unique; and
  an indicator material to show the presence of the marker.

In one embodiment of the invention, the matrix comprises water soluble potassium silicate. This embodiment provides the advantage of not requiring very high temperature to melt the glass particles to form the adhesive protective layer. Such an adhesive protective layer may be formed upon drying the applied layer at room temperature or slightly elevated temperature of around 100° C.

In a preferred embodiment of the invention the marker comprises a fingerprint and which is preferably an organometallic fingerprint.

In another preferred embodiment of the invention the marker further comprises an indicator which may, for example, be an inorganic indicator. Preferably in the case of a covert marker, the indicator comprises at least one phosphorescent or fluorescent material capable of phosphorescing or fluorescing at particular wavelengths when subjected to a particular stimulus. Preferably, the indicator comprises at least one material capable of phosphorescing or fluorescing when subjected to an infrared or ultraviolet stimulus.

In accordance with the present invention, the matrix is such that it is capable of preserving the integrity of the markers at high temperatures, preferably between 100° C. to 450° C.

In one embodiment of the invention, the marker system is provided in a sprayable form.

An engine, an engine part, an exhaust system and/or a catalytic converter comprising a surface coated or otherwise impregnated with the marker system also forms part of the present invention.

In one embodiment of the invention there is disclosed the use of the marker system described herein on the surface of an engine, an engine part, an exhaust system and/or a catalytic converter. As described above, the extreme conditions under which engines, engine parts, exhaust systems and catalytic converters operate, requires a marker system which maintains its structural integrity when exposed to highly toxic, flammable and/or corrosive substances as well as extreme temperatures in order to be able to carry out its function as an identifier of the proprietor of the vehicle. It has been identified by the inventor that the claimed marker is able to maintain its structural integrity under these extreme conditions over long periods of time.

In one embodiment of the invention, there is disclosed a method for marking an engine or a part thereof, an exhaust system and/or a catalytic converter comprising: applying the marker system as described herein to the surface of an engine or a part thereof, an exhaust system and/or a catalytic converter. Preferably, the adhesive protective layer is formed by drying the layer at room temperature. Optionally, the adhesive protective layer is formed by drying the layer at temperatures around 100° C.

In a further embodiment of the invention, there is disclosed a method of identifying an engine or a part thereof, an exhaust system and/or a catalytic converter comprising a marker system as described herein, the method comprising: using a digital camera to measure the marker system under UV and/or IR radiation; recording the measurements defining the marker system from the surface of the engine or part thereof, the exhaust system and/or the catalytic converter; and comparing the recorded measurements with a database comprising details of all measurements. Preferably, the method further comprises the step of aligning the digital camera in respect of the marker system. Preferably, the digital camera comprises an alignment mechanism allowing the camera to be correctly aligned to the marker system. Additionally or alternatively, the digital camera is aligned to the marker system by aligning one or more marks on the surface of the engine, the engine part, the exhaust system and/or the catalytic converter with one or more marks on the digital camera.

BRIEF DESCRIPTION OF THE DRAWINGS

FIG. 1 is a chart showing the analytical results from a 13 component fingerprint after a 4 month period at a constant 450° C. in a soluble potassium silicate matrix.

The invention will now be further described with reference to the following exemplary embodiment.

Matrix

The marker system is held in place by a matrix. The present invention uses a soluble silicate as the matrix. This offers several improvements over previous matrices which require the use of both organic and inorganic entities.

Previous matrices required the use of an organic medium to form a cohesive film at room temperature to hold a low melting point glass powder in place. The glass powder then melts as the temperature increases forming a high temperature resistant film. As the temperature increases the organic medium burns off leaving just the glass in place The present invention uses a soluble silicate. Preferably, a potassium silicate is used as the matrix. This forms a film at room temperature and means that an organic medium is not required. The soluble silicate has been found to be an improvement over systems which use glass powders in that as the silicate is water soluble it forms a homogeneous layer when applied to the surface of the object being marked.

Further, the use of a soluble silicate is advantageous over systems which use glass powders in that there is no need to ensure uniform distribution of the powder by continually agitating the mixture during application. In glass powder systems, if this agitation is not completely effective, i.e. the powder is not uniformly distributed, then the matrix formed may be of varying thickness and strength. This problem has been found to be overcome by using a soluble silicate.

Further, systems which use two different matrices have been found to causes difficulties in that the inorganic matrix has to cross link to form a cohesive layer before the organic material burns off. Therefore, in these systems, there is a critical relationship between the polymer thermal stability and the cross-linking of the glass powder which is difficult to control. It has been found that the use of a soluble silicate negates this issue.

Preferably, the matrix of the present invention is applied to a substrate which is the surface of a device that is hot when in use. Additionally it is preferable that the marker is applied when the substrate is at room temperature so that the silicate matrix air dries to form a layer with no additional heating required. When the device becomes operational the substrate to which the marker has been applied will increase in temperature at a rate which is variable depending upon the actual device and the conditions of use. One advantage of the present invention is that the soluble silicate is not affected by the rate of heating and will crosslink to form a glass as the temperature increases.

It has been found by the inventor that if the silicate is placed immediately into a hot furnace at 200° C. it will blister and produce large white flakes which are readily removed from the surface. However, the inventor has determined that application onto a surface at room temperature, followed by room temperature drying, preferably for 30 minutes then increasing the temperature up to a maximum of 450° C. produces a hard, durable film which has good adhesion to the substrate.

The inventor has therefore found that this method of application the soluble silicate provides a way of providing a uniform surface coating which advantageously does not require the presence of a polymer emulsion.

Marker

The marker detailed above may further comprise a fingerprint and/or an indicator. It is preferable that each of the components of the marker is also capable of withstanding or are resilient to high temperatures; between 100° C. to 450° C.

Fingerprint

The marker preferably comprises a unique fingerprint capable of distinguishing one marker system from that of another and to identify the substrate such as engine, exhaust system and/or catalytic converter to which it is applied. The fingerprint therefore imparts unique characteristics to each marker and the surface to which it has been applied. The fingerprint may comprise a solvent medium containing a volatile component, together with for example one or more trace materials which can be varied in such a manner as to produce unique formulations. The combinations of trace materials may advantageously be varied by modelling the compositions on, for example, binary strings to produce large numbers of unique products. However, other suitable coding methodologies may also be utilised as appropriate. The term "trace materials" applies herein to materials which would not normally be present in the environment of use. The most commonly used trace materials are metal compounds.

Trace materials can advantageously, therefore, be combined in a way which provides excellent evidential value to law enforcement agencies, as each unique formulation may be allocated to a particular premises, location or person, and this information is stored in a central database which could advantageously be accessed by a law enforcement agency, for example.

The trace materials may be assigned constant positions in a binary string with their presence being given by a "1", and their absence by a "0". If, for example, one were to set a limit of thirty digits for the string, one could begin with combinations of two trace materials, and generate all combinations containing any two trace materials. One could then go to groups of three trace materials, and generate all combinations of any three trace materials. This could continue until the number of trace materials is equal to the number of digits in the string.

With a thirty digit string, the total number of unique combinations of trace materials is approximately one billion. However, it is possible to prepare an infinite number of mixtures having compositions based upon unique binary sequences, the composition of each being unique.

Binary strings are provided as exemplary of the manufacturing procedures which can be used. Octal strings may also be used. Decimal numbers and random number generation can be used to generate potential codes, although these will need to be checked and converted to binary or octal sequences prior to use.

The unique nature of each composition can be checked during Quality Control following manufacture. The composition can then be stored in a database, allocated to an engine or part thereof, an exhaust system and/or a catalytic converter, and the source of the engine, engine part, exhaust system and/or catalytic converters located at a later time can be traced to the premises, location or person via the composition.

Of course, the greater the number of trace materials used, the greater the certainty in identification later on, since the chance presence of trace materials can be ruled out.

To determine the fingerprint which was best able to withstand the effect of high temperatures, several different types of fingerprint were tested. Organic materials were carbonised at relatively low temperatures of less than 450° C.

In one embodiment of the invention, inorganic materials may be used as the fingerprint.

However, a preferred fingerprint for use in the invention is an organometallic material. During testing, these compounds yielded the best results as they were initially easy to work with and when subjected to high temperature, the organic burnt off leaving the metals as fingerprint. Such materials were tested in a furnace at 450° C. weekly over a period of 4 months. Analysis of the fingerprint after this time showed the fingerprint to be intact and complete with little variation in both the overall level of materials present and in the relative amounts of each.

FIG. 1 is a chart that shows the analytical results from a 13 component fingerprint after a 4 month period at a constant 450° C. in a soluble potassium silicate matrix. After this extended period of constant high temperature all components are still present at a level significantly higher than the background noise which is typically 1% of the maximum peak height and is too low to measure on the scale used. The chart is a mass spectrum showing the elements present labelled as components and with increasing atomic weight from left to right. The Y axis is the intensity of the spectrum and shows the amount of material present during the analysis.

Indicator

The marker preferably comprises an indicator material, which can quickly provide a preliminary, gross indication of the presence of a composition according to the invention. The indicator material can either be "overt" or "covert." An overt material is typically one which can be seen unaided by technology, such as a dye or pigment. With an overt indicator, it is immediately evident from an observation of the article or person that a mark has been provide thereon which may act as a deterrent. In one embodiment both a covert and overt mark may be applied thus combining the deterrent effect of the overt mark with the covert properties of the covert mark. For example, if the overt mark failed to act as a deterrent and the perpetrator tried to remove the overt mark; even if they were successful the stolen engine, exhaust system and/or catalytic converter could nevertheless still be identified by virtue of the covert mark.

A covert indicator will remain hidden until some technical means or stimulus is used to make it obvious. Usually, a covert indicator will become visible upon application of a radiation source other than visible light, and of these, fluorescent indicators are most common. Thus, the covert indicator will often be at least one fluorescent material which is soluble in a solvent system, and which is easily detectable upon examination with ultraviolet light, for example.

It is possible to utilise a fluorescent material which when exposed to UV light fluoresces in a particular colour, each particular fluorescent material being selected for a particular customer, so that when the composition containing the selected fluorescent material is applied to a surface of articles or goods, then any unauthorised removal of such articles or goods can be linked back to the particular customer as the source of goods. It is further possible to utilise a combination of two or more fluorescent materials having differing λ max emission wavelengths.

It is possible to identify said two or more materials by utilising a UV-absorption spectrum or a fluorescent emission spectrum of an indicator. Accordingly, such combination of materials, when applied to a surface of articles or goods, can also be used to link the particular goods to the customer. Alternatively or additionally, the indicator may comprise at least one phosphorescent material capable of phosphorescing when subjected to stimulus.

The indicator is preferably utilised in spray form and can be combined with various solvent systems and surfactants. The indicator is suitably present in an amount of 0.1 to 40% by weight of the composition.

When the gross indicator means is fluorescent, the composition can include one or more of any suitable fluorescent materials.

In terms of suitable indicators, both organic and inorganic materials were tested. Some organics, especially of the oxazinone functionality may be used.

However, a preferred compound for use in the invention as an indicator is an inorganic emitter. A range of inorganic emitters were tested and some of these maintained a good fluorescent emission for temperatures between room temperature to 450° C. Various indicators were found to have the necessary thermal stability and to not lose their fluorescence over a period of 4 months at 450° C. These were all inorganic in nature and several are available, the final choice will depend on the required colour of the fluorescence. Examples of such are:

Invisible Blue E which emits blue under 365 nm UV light
CY-R1 which emits red under 365 nm UV light
CY-G1 which emits green under 365 nm UV light Marker System Testing was performed for a marker system comprising an indicator, a fingerprint, and a matrix of potassium silicate in water. The combination of these materials gave a marker that does stay operational and fully functional at temperatures between room temperature and 450° C.

In an embodiment of the invention, this marker system may be applied to an article. In a preferred embodiment, the marker system is colourless, odourless and has no feel thereto, and is therefore undetectable.

A number of embodiments have been described herein. However, it will be understood by persons skilled in the art that other variants and modifications may be made without departing from the scope of the embodiments as defined in the claims appended hereto.

EXAMPLES

Example 1: Testing of the Organic Medium/Inorganic Matrix

The present invention provides a marker system that is stable to high temperatures for extended periods of time. The temperature chosen to maximise the effect of heat was 450° C. and the duration of the continuous testing at this temperature amounted to several months.

Various types of matrices were tested at a temperature of 450° C. for extended periods of time amounting to several months. These included including organic polymers, but none had the same extended high temperature stability. In addition mixtures of the potassium silicate preparation with organic polymers formed good, strong surface coatings at room temperature, but none withstood extended testing at this temperature.

The observed degradation showed either a charring/blackening of the surface coating, or the complete loss of the coating from the surface to which it had been applied.

Experimental Details

The testing of various matrices was undertaken as shown below for silicone adhesive sealant:

It was found generally that the sealant hereinbefore described is clear and manufacturers report has a good degree of heat resistance. It is medium viscosity paste and non-slump, recommended for use with metal, glass and glazed ceramics.

Temperature Resistance:

To test the temperature resistance of the sealant, samples were applied to a metal plate and allowed to dry overnight. The metal plates were then placed into a furnace. The temperature of the furnace was increased to 450° C. over a period of 3 hours and then held in the furnace at 450° C. for a further 3 hours before reducing the temperature to room temperature.

Both a bead of ~3 cm in diameter of sealant was applied to the metal surface and a bead which was spread to form a thin film coating the metal surface were tested. The thin smear of silicone was achieved by smoothing the bead using a wet gloved finger. Observation showed that the silicone does adhere to the metal surfaces, but can be easily removed especially when a thick bead is applied.

After drying overnight, the thicker silicone bead is clearly visible and easy to remove as it simply peels away. The thinner silicone smear is less visible but can still be very easily removed by peeling or rubbing.

When inspected after heating, as described above, and whilst still hot above 100° C., the silicone has degraded completely in both cases and has a fibrous, white appearance, with white 'strings' clearly visible. Upon cooling fully to room temperature both thick and thin films then formed a white powder.

The stainless steel was cleaned thoroughly and samples were re-applied and heated in the same process to a maximum of 400° C. Once again, both samples formed a white powder.

These results indicate that silicone adhesive is completely unsuitable for high temperature applications.

Similar results were obtained in testing of acrylate, urethane, acetate and pvc emulsion polymers in the same manner as detailed above. Good thermal stability was obtained through the use of high temperature aluminium paint, but as this is overt and not usable with a covert marker no further work was undertaken with this type of material.

Soluble Potassium Silicate

This material was tested at various concentrations in water. It was tested at both the air dried stage and after exposure to higher temperature.

Solutions of 30% wt/wt, 40% wt/wt, 50% wt/wt and 60% wt/wt in water were tested. Concentrations higher than this became difficult to dissolve. The solutions were all dried at room temperature to form cohesive surface coatings on to various substrates that would be capable of high temperature exposure. It was noticeable that although the surface coating did adhere well to the substrate, there was little physical strength and the material could be removed by abrasion. The resistance of the surface coating of this type of removal increased with the concentration of the silicate. Also, it was found that rougher substrates gave better adhesion than those with a smoother surface.

The surface coatings were allowed to dry at room temperature and then they were heated up to 450° C. They were then removed from the heat source at daily intervals and tested. The strength of the film forming the surface coating had increased significantly over the room temperature dried material and had good resistance to abrasion. It was found that this resistance did not increase in subsequent days beyond the first. The strength of the bond to the substrate did increase with concentration of the silicate in water. The most concentrated solution, i.e. 70% wt/wt, gave the strongest and thickest layer.

This material, based upon concentrations of 30% wt/wt, 40% wt/wt, 50% wt/wt and 60% wt/wt potassium silicate in water was then tested and sampled periodically over a period of several months at a temperature of 450° C. No change or deterioration in the surface coating was noted over this period and it remained a colourless, clear intact surface coating on the substrates tested. The substrates tested were cast iron, stainless steel and porcelain. The 60% wt/wt solutions gave a surface coating with thickest film, whereas the 30% wt/wt gave the most transparent layer. The choice of concentration depends upon the actual requirements of the surface coating.

The results from these tests indicated that this material was well suited to provide the matrix needed for the marker. Based upon these results it was then used as the matrix in formulations used for the testing possible indicator and fingerprint materials.

Example 2: Testing of the Indicator

Various indicators were tested including DNA based systems and systems based upon other organic moieties and silicone based products. However none of these had the required stability under the conditions described above.

In order for the position of a covert marker to be identified an indicator is also required. Various types of indicator are available which emit visible radiation in response to different forms of stimulation Ultra violet (UV) emission at 365 nm was used and infrared (IR) radiation at 980 nm. Various organic and inorganic indicators were tested, but none of the organic materials had the necessary stability.

Not all the inorganic materials tested had the required stability, although some did. Of these materials responding to UV are by far the brighter due to Stokes emission rather than the anti-Stokes obtained from those responding to IR.

Of these UV activated materials a wide range of emitted colours are available and the choice to be made is largely cosmetic.

Testing of these materials at 450° C. over a period of 4 months showed no loss of emission intensity over this period of time. All the materials stable under these conditions were inorganic and the choice will be determined by the colour of the fluorescence that is required. Such materials can be made to fluoresce in various colours for example yellow and red under long wave UV and are generally based upon an inorganic metal oxide with a dopant to give the required colour.

Example 3: Testing of the Fingerprint

Extended stability tests of metal based fingerprints showed them to have the required stability when used in the medium described above. Repeated weekly analysis of fingerprints held continuously at 450° C. showed no decrease in the fingerprint level over a period of 4 months. These results are confirmed by the analytical results shown above.

The invention claimed is:

1. A marker system for applying to surfaces operating at high temperatures, the marker system comprising a marker and a temperature resilient medium capable of securing the marker system onto a surface having a high temperature;
   wherein the medium contains one silicate compound configured for forming an inorganic matrix consisting essentially of the one silicate compound for securing the marker to a surface;
   wherein the marker comprises a fingerprint to render the marker unique, the fingerprint being a unique combination of materials having a unique mass spectrum compared to the mass spectra of other fingerprints in a database;
   wherein the marker system further comprises at least one fluorescent or phosphorescent indicator material to indicate the presence of the marker,
   wherein the silicate compound is the only silicate of the marker system, and
   wherein the high temperature is less than 450° C.

2. The marker system of claim 1, wherein the inorganic matrix serves as an adhesive layer to substantially preserve the integrity of the marker.

3. The marker system of claim 1, wherein the silicate compound is a potassium silicate.

4. The marker system of claim 3, wherein the concentration of the potassium silicate is in a range between 30% wt/wt and 70% wt/wt.

5. The marker system of claim 3, wherein the concentration of potassium silicate is 60% wt/wt or 70% wt/wt.

6. The marker system of claim 1, wherein the medium comprises a material having a high inherent stability that is resistant to environmental conditions and/or removal through washing or abrasion.

7. The marker system of claim 1, wherein the fingerprint is an organometallic fingerprint.

8. The marker system of claim 7, wherein the fingerprint comprises a unique identifying tracer.

9. The marker system of claim 1, wherein the indicator comprises an inorganic indicator.

10. The marker system of claim 9, wherein the indicator comprises at least one material capable of phosphorescing when subjected to stimulus.

11. The marker system of claim 9, wherein the indicator comprises at least one material capable of emitting visible or near infrared radiation at a specific frequency when subjected to infrared stimulus.

12. The marker system of claim 9, wherein the indicator comprises at least one material capable of emitting visible or near infrared radiation when subject to ultraviolet stimulus.

13. The marker system of claim 12, wherein the indicator comprises Green E.

14. The marker system of claim 1, wherein the matrix is capable of preserving the integrity of the markers at the high temperature.

15. The marker system of claim 1, wherein the marker system is applied to a surface of an engine, an engine part, an exhaust system and/or a catalytic converter.

16. The marker system of claim 1, wherein the at least one indicator material is the only component of the marker system which emits light under UV or IR stimulus.

17. The marker system of claim 16, wherein the marker system comprises only one indicator material.

* * * * *